Aug. 17, 1926.
L. W. G. GRIEVES
1,596,097
MOTOR VEHICLE WHEEL
Filed March 30, 1925
2 Sheets-Sheet 1
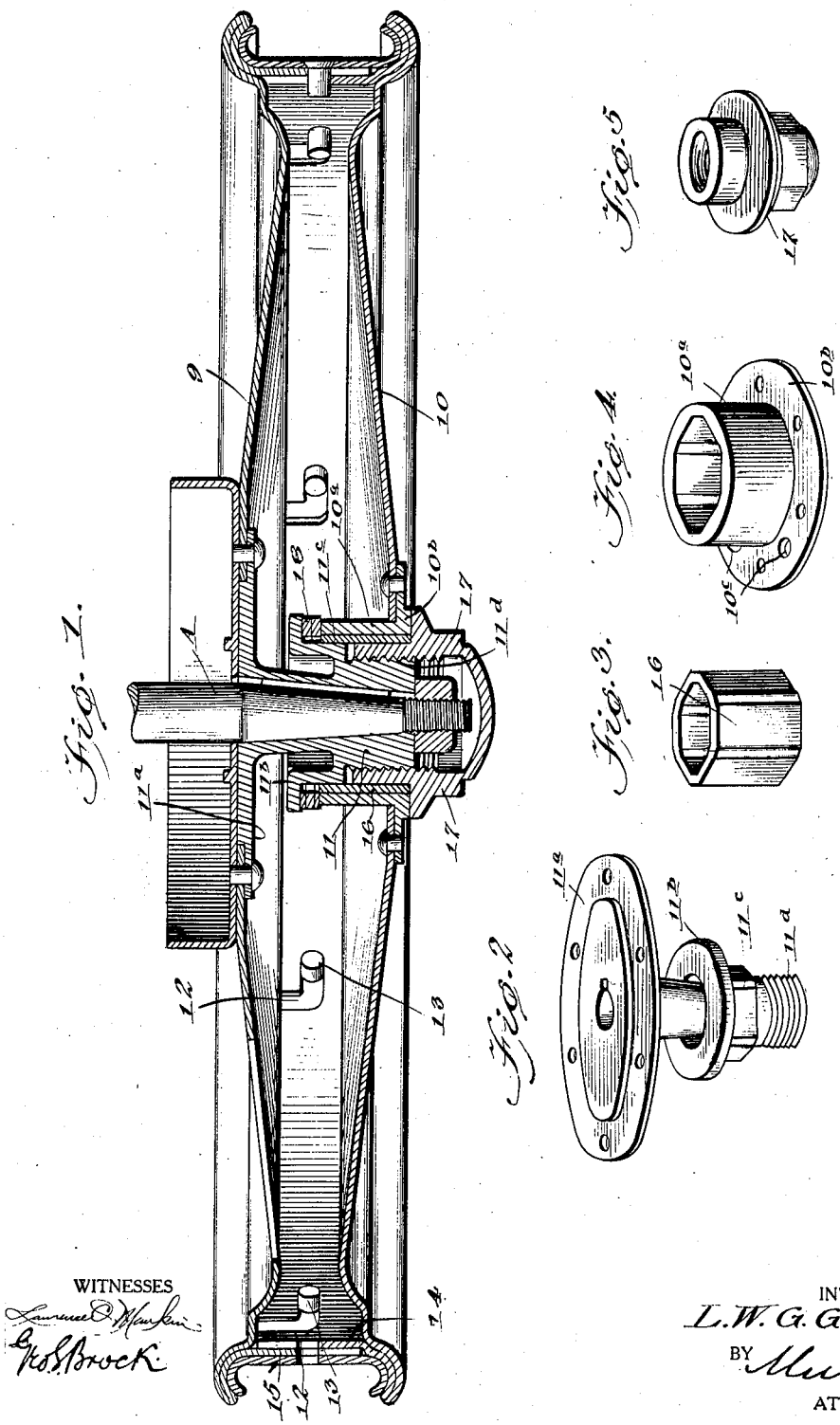
WITNESSES
INVENTOR
L. W. G. Grieves,
BY
ATTORNEYS Aug. 17, 1926. 1,596,097
L. W. G. GRIEVES
MOTOR VEHICLE WHEEL
Filed March 30, 1925 2 Sheets-Sheet 2
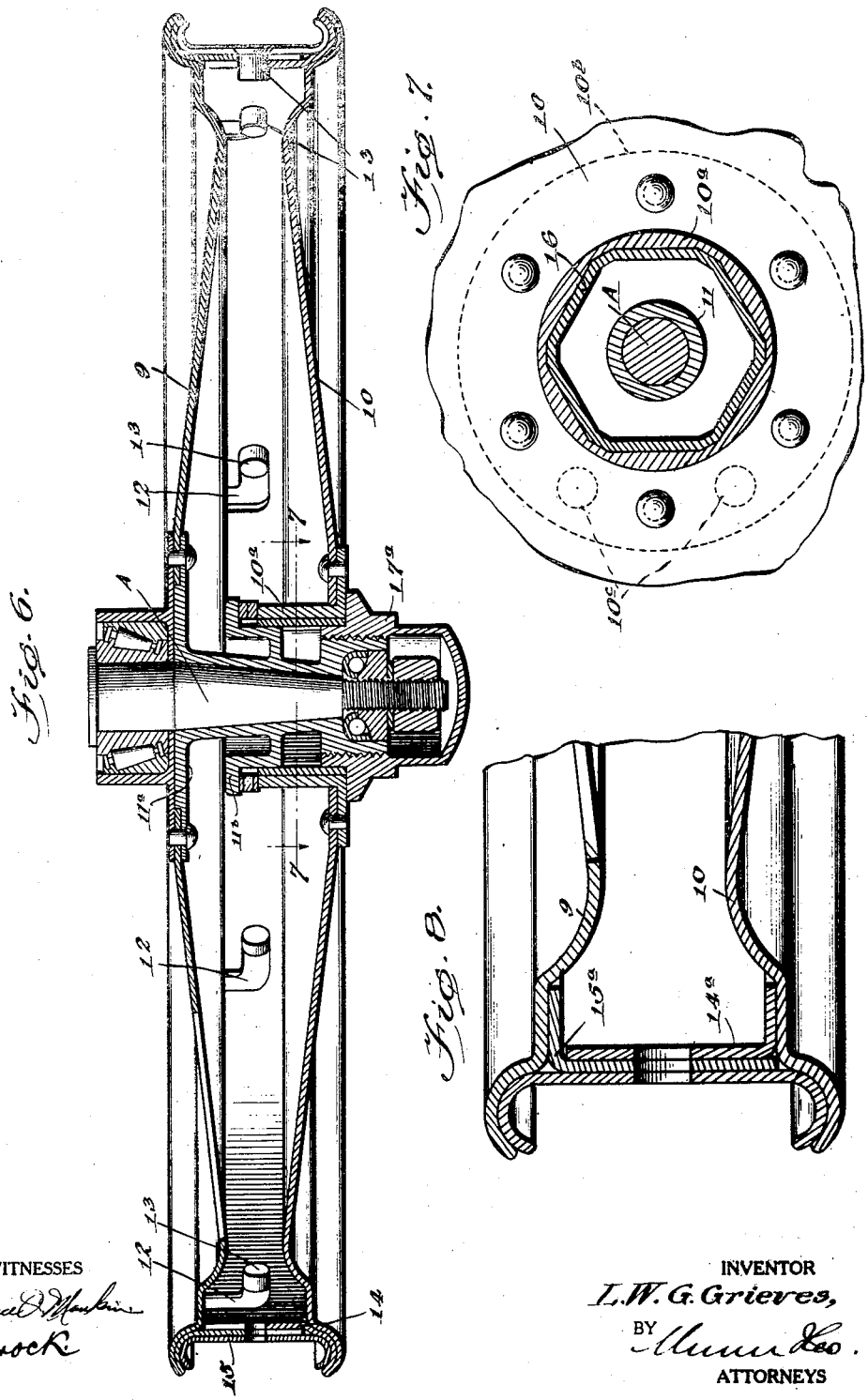
WITNESSES
INVENTOR
L. W. G. Grieves,
BY
ATTORNEYS Patented Aug. 17, 1926.

1,596,097

UNITED STATES PATENT OFFICE.

LAURANCE WILLIAM GOLDSMID GRIEVES, OF AUCKLAND, NEW ZEALAND.

MOTOR-VEHICLE WHEEL.

Application filed March 30, 1925. Serial No. 19,503.

This invention which is designed as an improvement upon my pending application, Serial No. 595,851, relates to vehicle wheels and more particularly to disk motor vehicle wheels provided with means for holding pneumatic tires, and has for an object to provide means for facilitating the removing and replacing of such tires.

Another object is the provision of parts in a disk wheel made up of two opposing tensioned disks, one movable and the other rigidly connected with the hub, whereby to prevent rotary movement of one disk in relation to the other when the parts are assembled.

Another object is the provision of means whereby the disks can be separated quickly when necessary to change a tire, and reassembled.

Another object is to provide means for locking the movable disk against relative rotary movement with respect to the hub.

Another object of the invention is to provide a locking sleeve whereby to prevent rotary movement of one disk relatively to the other disk.

With these and other objects in view the present invention in certain novel features of construction, arrangement and combination of parts as will be hereinafter fully described, and pointed out in the claims, reference being had to the accompanying drawing forming a part hereof, and in which:

Figure 1 is a central section through a rear wheel showing an embodiment of my invention.

Figure 2 is a perspective view of the hub structure of the same wheel.

Figure 3 is a perspective view of the locking sleeve.

Figure 4 is a similar view of the bushing and reinforcing means for the hub opening of the movable disk.

Figure 5 is a perspective view of the hub cap for the wheel.

Figure 6 is a central section of a front wheel showing an embodiment of the present invention.

Figure 7 is an enlarged fragmentary section taken on line 7—7 of Figure 6, looking in direction indicated by the arrows.

Figure 8 is an enlarged sectional view of the outer peripheral portion of a wheel showing a slightly modified form of disk coupling means.

According to the present invention the wheel comprises two disks 9 and 10 dished or tensioned, the dished portions disposed in opposing relation. The disk 9 which will be known as the inner disk, is rigidly connected to an annular flange 11$^a$ at the inner end of the hub 11, while the outer disk 10 has a central opening reinforced by a flanged bushing 10$^a$, whereby to pass longitudinally over the hub.

The two disks are connected at or adjacent their outer peripheries by a series of bayonet joints comprising slots 12 and pins 13, the slots being disposed in an inwardly extending annular band 14 projecting from the outer and movable disk 10 while the pins project radially inward from an annular band 15 of the rigid inner disk 9, the band 14 being of sufficiently less diameter than that of band 15 whereby it may be moved laterally within and then turned circumferentially to nest and lock therein.

The hub includes the barrel portion 11 having the central bore appropriately shaped to receive the associated axle A, an inner flange 11$^a$ to which the inner disk 9 is rigidly connected, an intermediate flange 11$^b$ having the reduced hexagonal shaped shoulder portion 11$^c$, and the still further reduced outer end portion which is externally threaded as indicated at 11$^d$, to receive the cap nut, as will be more fully pointed out hereinafter.

The shoulder portion 11$^c$ of the hub is preferably hexagonal shape and extends outwardly to form a support upon which the hexagonal locking sleeve 16 is slid longitudinally. The central cap nut 17 is then screwed on the threaded portion 11$^d$ of the hub passing inside the removable sleeve 16' and bearing against the outer end of same and the flanged bushing 10$^a$ of the movable disk 10, pressing both sleeve and bushing against a spring 18 surrounding the hub at the hexagonal shouldered portion, which spring is in turn pressed against the intermediate annular flange 11$^b$ of the hub, this particular arrangement and relation of the above recited parts preventing any rotation of the movable disk 10 in relation to the fixed disk 9.

The movable disk, as before stated, has a central opening which is reinforced by the flanged bushing 10$^a$, the flange 10$^b$ being rigidly connected to the disk as clearly indicated in Figures 1 and 6, the bore of the bushing being hexagonal to conform to the periphery of the removable locking sleeve 16 upon which may be slid longitudinally and held by the cap nut 17. The flange 10$^b$ of the bushing is also provided with spaced apart openings 10$^c$ for insertion of a tool to turn the movable disk 10 the length of travel of the bayonet slots.

In Figure 6, is shown a section of a front wheel the parts of which are the same as in Figure 1 except the bearings and the cap nut 17$^a$ in which the cap portion is somewhat deeper to accommodate the axle nut. In other respects the essential parts of the two constructions are the same and the same reference characters have been used.

In Figure 7 a slightly modified nesting band construction is shown, the disk 9 having welded within it the pin carrying band 15$^a$ while the outer disk 10 carries the bayonet slot band 14$^a$, the disks being connected and disconnected in the same manner as in the other figures.

The locking sleeve is provided with holes as an aid to its withdrawal.

With the parts in the position shown in Figures 1 and 6 the central cap nut 17 must be taken off the hub and the sleeve 16 withdrawn from its position on the hub and in the bushing 10$^a$ before the movable outer disk 10 can be rotated and withdrawn from the fixed inner disk 9.

It should be noted that the spring 18 having a bearing at one end against the flange 11$^b$ and at the other against the hexagonal sleeve 16 and the bushing 10$^b$ of the outer disk 10 puts this disk under tension against the cap nut and prevents rotary movement of said disk 10 with relation to the fixed disk 9 and the hub 11, as against shocks and jerking movements.

While I prefer to use the hexagonal shape in the locking sleeve, the shouldered portion of the hub and the bore of the removable disk bushing it is of course understood that any appropriate non-circular formation may be used.

Having thus described my invention, what I claim is:

1. In a vehicle wheel of the character described the combination of a hub, an inner disk rigidly mounted on said hub, an outer disk having a noncircular central opening and adapted to loosely fit said hub, means carried within said disks adjacent their periphery for connecting and locking the said disks together, said hub having a noncircular barrel portion, a removable noncircular sleeve inserted within the central opening of the outer disk and fitting on the noncircular barrel portion of the hub, and means for forcing and holding said sleeve in such position.

2. In a vehicle wheel of the character described, the combination of a hub having an intermediate noncircular barrel portion, and a reduced threaded outer end, an inner disk member rigidly fixed to the inner end of said hub, an outer disk member having a noncircular central opening adapted to loosely fit on said hub, a removable noncircular locking sleeve inserted within the said central opening and fitting upon said barrel portion, and adjustable means for holding said sleeve and outer disk on the hub.

3. In a vehicle wheel of the character described, the combination of a hub having an intermediate annular flange and a hexagonal barrel portion in advance of said flange, an inner disk member rigidly fixed at the inner end of the hub, an outer disk member having a hexagonal central bushing adapted to fit loosely on said hub, a removable hexagonal locking sleeve adapted to fit within said bushing and upon said hexagonal barrel portion in advance of said intermediate hub flange, a spring mounted on said hub between the inner ends of the associated sleeve and bushing and the said intermediate flange, and adjustable means mounted on the hub engaging the outer ends of said sleeve and bushing to maintain the same against pressure of the said spring, said disks provided with detachable means of connection adjacent their rim portions, substantially as set forth.

4. An arrangement of parts about the hub of a disk wheel including a fixed inner disk and a movable outer disk, the outer disk having a noncircular central opening, and consisting of a removable noncircular sleeve inserted in said disk opening and supported on the hub, whereby to lock said parts against relative rotary movement.

LAURANCE WILLIAM GOLDSMID GRIEVES.